Oct. 8, 1929.  J. A. WRIGHT  1,730,598
CHASSIS FRAME
Filed Dec. 7, 1927  3 Sheets-Sheet 2

Inventor
James A. Wright
By
Attorney

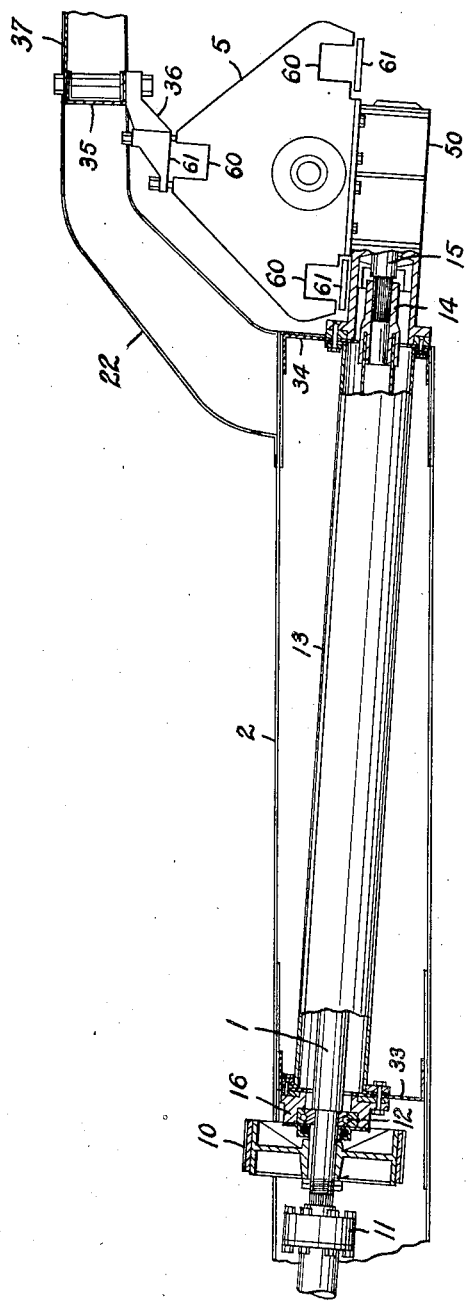

Patented Oct. 8, 1929

1,730,598

UNITED STATES PATENT OFFICE

JAMES A. WRIGHT, OF MONTREAL, QUEBEC, CANADA

CHASSIS FRAME

Application filed December 7, 1927. Serial No. 238,400.

This invention relates to motor vehicles and particularly to improvements in those having independent wheel suspension on transverse springs.

Among these improvements, a chassis is provided, having a very low center of gravity, whereby greater stability and increased safety are secured.

A further object is to provide a chassis, which while giving sufficient road clearance, body head room and ease of entry and exit, carries the motive elements and car body at the minimum elevation, whereby wind resistance is reduced and an improved stream line construction is obtainable.

These novel features permit the construction of a car in which not only the safety and stability are increased but also the efficiency of operation and economy of maintenance are benefited and greater comfort is obtainable.

Further objects which are secured by this invention will be set forth hereinafter.

The invention consists in an improved frame in which the differential casing, the torque tube and its connections form important features.

Reference is made to the accompanying drawings in which:—

Figure 3 is an enlarged view of the main shaft and differential suspension.

Figure 1:
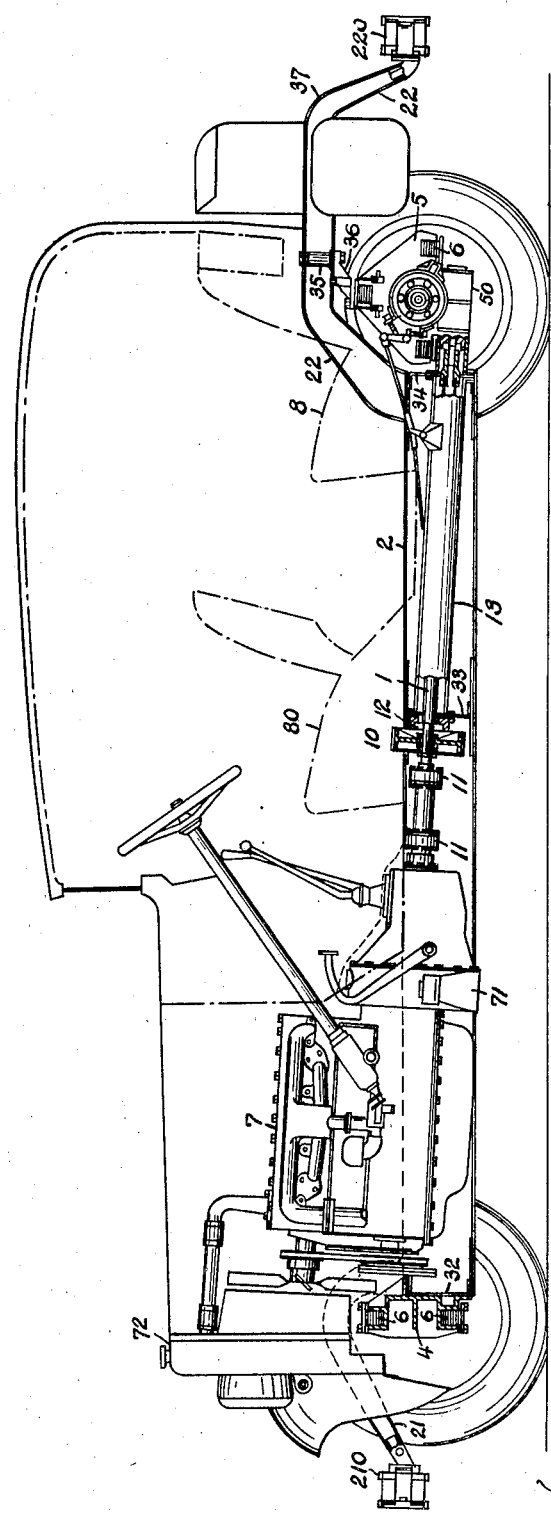
Figure 1 is a side view, partly in section.
Figure 2:
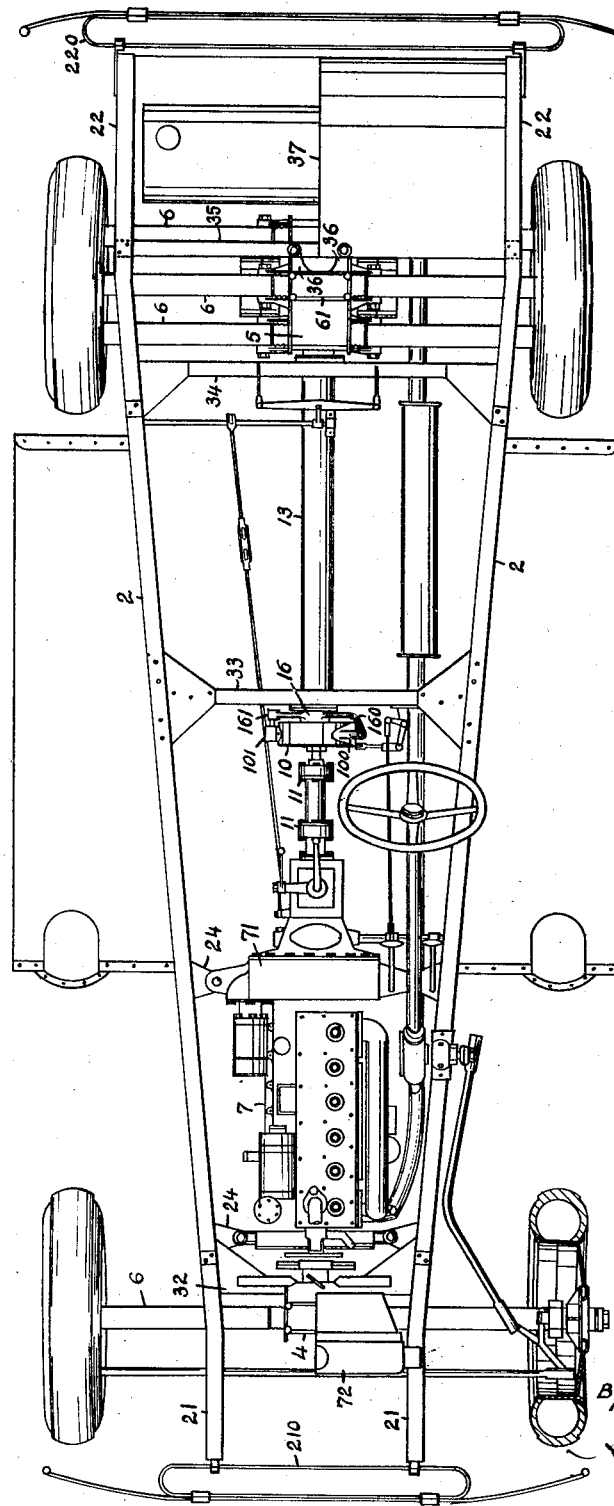
Figure 2 is a plan view of the chassis.

The chassis frame consists of side channel members 2—2 connected by cross channel members 32, 33 and 34 and by a four point engine suspension. The intermediate cross member 33 and the rear cross member 34 are centrally connected by a torque tube 13. They are both inclined rearwardly to permit the torque tube 13 which is bolted to them at right angles, to have a decided incline to the rear as clearly shown in Figure 3.

The main frame has forward and rearward extensions 21 and 22 which are arched members riveted to the upper flange of the side members 2—2. The rear extension members 22—22 are connected by a cross channel 35 and a cover plate 37.

The differential casing 5 which houses the transverse springs 6 in seats 60 is connected centrally to the cross member 34 and the rear end of the torque tube 13 through the worm casing 50 which forms the bottom plate of the differential casing 5 and to the cross member 35 and the cover plate 37 by the brackets 36 which extend rearwardly from the top spring anchor plate 61.

The side members 2—2 spread outwardly to the rear, and the rear extension members 22—22 continue to spread outwardly and provide ample width for the rear seat 8 between them.

The front end of the torque tube 13 is secured through the cross member 33 to a ring 16 in which the bearing 12 is housed. This ring 16 has brackets 160 and 161 projecting from its sides, on which the brake control 100 and the brake band anchorage 101 are respectively mounted.

The bearing 12 journals the main shaft 1 at this point.

The brake drum 10 is keyed to the main shaft 1 in front of the bearing 12 and behind the flexible couplings 11—11 which connect the main shaft 1 with the transmission mechanism and the engine 7.

The rear end of the shaft 1 carries a sleeve 14 which has a splined connection with the front end of the worm stub spindle 15 journalled in bearings in the worm casing 50.

The cross member 32 which connects the front ends of the side members 2—2 is bolted centrally to the spring seating yoke block 4 low down as shown in Figure 1.

The front extensions 21—21 support the radiator 72 and the front bumper 210.

The rear bumper 220 is secured to the ends of the rear extension members 22—22.

The engine 7 is hung on brackets 24 which extend inwardly from the side members 2—2, two at the front end and two at the sides of the flywheel and clutch casing 71.

The brake drum 10 is directly under the front seat 80 and does not extend below the frame.

By means of a construction such as is shown and described herein a chassis is provided in which the center of gravity is extremely low, on which the car body of minimum height can be mounted, whereby great safety and stability are secured, the wind resistance reduced and good stream line effect obtained.

The frame with drive mechanism, engine and car body all rigidly mounted thereon, and the whole assembly suspended on transverse springs coupled to independent wheels, result in a car remarkable for its safety, comfort, convenience and smooth running qualities.

The road shocks which the wheels receive are absorbed by the springs before they reach the frame and affect the car body.

The torsional stresses of the drive mechanism due to road or other effects, are taken up by the torque tube and its connections. The braking stresses of the brake drum, which is journalled in bearings supported by the toque tube, will be absorbed by it, and absence of vibration and rattle will result.

The differential casing in which the transverse springs of the rear suspension are seated, with its attached worm casing form a bridge between the torque tube of the main frame and the cross channel of the rear extension frame, and add strength to the frame structure and rigidity to the spring housings.

The weights of the car body and chassis are evenly distributed to the wheels through the springs. The rigid character of both the differential casing and worm casing which carry the bearings of the drive mechanism, ensures more efficient operation and less expense in repairs and replacements of worn parts.

As the chassis is entirely sprung weight, road and other shocks are to a great extent absorbed by the springs and do not reach the frame and car body.

The incline of the torque tube downwards permits the rear floor board to be located well below the top of the frame side members. The brake drum being well below the front seat, does not affect the floor space of the front seat.

The side members of the frame being as low as possible entry to and exit from the car are easy and convenient.

The lowness of the chassis allows for a correspondingly low car body with its well known advantages.

I claim:

1. In a chassis, a frame comprising a pair of channelled side members, connected by front, middle and rear cross channels with an inclined torque tube secured to the centers of the middle and rear cross channels, which are inclined to be at right angles with the ends of the torque tube.

2. In a chassis, side frame members connected by cross channels, set at an angle from the vertical, and an inclined central torque tube secured to such cross channels and at right angles thereto.

3. In a chassis, a frame comprising channelled side members connected by front, middle and rear cross channels, a central torque tube connecting the middle and rear cross members, rear arched extension members to the side members, connected by a cross channel and a cover plate, with a differential casing and worm casing connecting the center of such cross channel and cover plate to the rear end of the torque tube.

4. In a chassis, a frame comprising channelled side members connected by cross channelled members, a central torque tube connecting the middle and rear cross members, a bearing seating ring secured to the front end of the torque tube and cross member, bearings mounted therein, and a main shaft journalled in the bearings and extending through the torque tube.

5. In a chassis, a frame comprising channelled side members connected by channelled cross members, a torque tube centrally connecting the middle and rear cross members, a bearing seating ring secured to the front end of the torque tube and cross member, bearings mounted therein and a main shaft journalled in the bearings, a brake drum keyed to the shaft adjacent the bearings, brackets projecting from the ring and brake control mechanism and a brake band anchorage mounted on the brackets.

6. In a chassis, a frame comprising channelled side members, front, middle and rear channelled cross members, a central torque tube connecting the middle and rear cross members, rear extension arched members connected by a cross channel, a differential casing housing transverse springs, anchor plates thereto, brackets extending from the top anchor plate secured centrally to the extension cross channel, the front of the differential casing being rigidly attached to the rear end of the torque tube and cross member.

7. In a chassis, a frame comprising channelled side members connected by front, middle and rear channelled cross members, a central torque tube connecting the middle and rear cross members, rear arched extension members connected by a cross channel and cover plate, a differential casing housing transverse springs, anchor plates thereto, brackets extending rearwardly from the top anchor plate secured centrally to the cross channel and cover plate, a worm casing secured to the bottom of the differential casing and rigidly attached to the rear end of the torque tube.

8. In a chassis, a differential casing housing transverse springs, anchor plates thereto, the top spring anchor plate having rearwardly projecting brackets, a worm casing forming the bottom of the differential casing, centrally connected to the cross members of the frame by the brackets and the worm casing.

9. In a chassis, frame, having a central torque tube secured between cross members of the frame, a drive shaft journalled at the front end thereof, a brake drum keyed to the shaft adjacent the shaft bearing, brake control mechanism and brake band anchorage mounted on the front end of the torque tube cross member, and a differential casing secured to the rear end of the torque tube and the cross member.

JAMES A. WRIGHT.